(12) United States Patent
Pahlavan et al.

(10) Patent No.: US 10,151,844 B1
(45) Date of Patent: Dec. 11, 2018

(54) LOCAL INDOOR POSITIONING AND NAVIGATION BY DETECTION OF ARBITRARY SIGNALS

(71) Applicant: MAXIM Integrated Products, Inc., San Jose, CA (US)

(72) Inventors: Kourosh Pahlavan, Cupertino, CA (US); Farokh Eskafi, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 431 days.

(21) Appl. No.: 14/701,515

(22) Filed: Apr. 30, 2015

Related U.S. Application Data

(63) Continuation-in-part of application No. 13/306,918, filed on Nov. 29, 2011, now Pat. No. 9,124,358.

(60) Provisional application No. 61/986,752, filed on Apr. 30, 2014, provisional application No. 61/417,560, filed on Nov. 29, 2010.

(51) Int. Cl.
*G01S 19/48* (2010.01)

(52) U.S. Cl.
CPC .................... *G01S 19/48* (2013.01)

(58) Field of Classification Search
CPC ........................................... G01S 19/48
USPC ................................... 342/357.31
See application file for complete search history.

(56) References Cited

U.S. PATENT DOCUMENTS

| | | | | |
|---|---|---|---|---|
| 7,180,421 B2* | 2/2007 | Pahlaven | ............. | G06K 7/0008 340/572.1 |
| 7,340,283 B1* | 3/2008 | Melick | .................... | G01S 19/11 342/357.29 |
| 2007/0171046 A1* | 7/2007 | Diem | ..................... | G06Q 10/00 340/539.13 |
| 2008/0055109 A1* | 3/2008 | Freathy | ............... | G07C 9/00111 340/8.1 |
| 2008/0252422 A1* | 10/2008 | Dowla | ................. | G06K 7/0008 340/10.1 |
| 2009/0065578 A1* | 3/2009 | Peterson | ............. | G05B 19/048 235/382 |
| 2010/0026569 A1* | 2/2010 | Amidi | ..................... | G01S 19/48 342/357.48 |
| 2011/0084832 A1* | 4/2011 | Midtun | .................. | G06Q 10/06 340/539.13 |
| 2011/0187600 A1* | 8/2011 | Landt | ........................ | G01S 3/02 342/458 |
| 2011/0298619 A1* | 12/2011 | O'Hare | ................ | A01K 11/008 340/573.1 |

(Continued)

*Primary Examiner* — Harry K Liu
(74) *Attorney, Agent, or Firm* — TIPS Group

(57) ABSTRACT

A wireless mobile device for local indoor positioning and navigation by detection of arbitrary signals comprising a GPS signal module capable of detecting a GPS constellation, an arbitrary signal module capable of interacting with a local device constellation, an application processor coupled to the GPS signal module and the arbitrary signal module, and memory coupled to the application processor including code segments executable on the application processor for a) identifying a GPS constellation with the GPS receiving module, b) identifying a local device constellation with the arbitrary signal module, and c) implementing a position and navigation process using at least one of a detected GPS constellation and a detected local device constellation.

15 Claims, 6 Drawing Sheets

(56) References Cited

U.S. PATENT DOCUMENTS

| | | | |
|---|---|---|---|
| 2012/0044974 A1* | 2/2012 | Mukai | G01S 13/767 375/141 |
| 2012/0109455 A1* | 5/2012 | Newman | G06F 3/03547 701/36 |

* cited by examiner

LOCAL INDOOR POSITIONING AND NAVIGATION BY DETECTION OF ARBITRARY SIGNALS

CROSS REFERENCE TO RELATED APPLICATION(S)

This application claims the benefit of U.S. Ser. No. 61/986,752, filed Apr. 30, 2014, and is a continuation-in-part of copending U.S. Ser. No. 13/306,918, filed Nov. 29, 2011, which claims the priority of U.S. Ser. No. 61/417,560, filed Nov. 29, 2010, all of which are incorporated herein by reference.

BACKGROUND

This invention relates generally to communication between a multitude of signal sources and corresponding signal recipients which can locate themselves with respect to each other or with a common frame of reference.

Determining a position in a physical space is often a desired piece of information in various navigational contexts. Outdoors, Global Positioning System (GPS) is an effective way to determine the position of a device. For example, a handheld device equipped with a GPS receiver can accurately determine its position with respect to a map.

A problem with the GPS systems is that a GPS receiver relies on satellite signals reaching it in a straight line. Indoors, inside urban canyons, under canopies, etc., where signals cannot meet this constraint, a GPS system may fail. Another problem with GPS systems is that they offer only coarse positioning accuracy and require a high degree of sensitivity and sophistication in the receiver device.

The fundamental approach in GPS can be applied to indoor environments by having GPS-like transmitters in sufficient numbers and at appropriate locations. However, when applied to very simple hardware, an indoor implementation of the GPS system becomes impractical. This is mainly due to the fact that the precision time base implemented in navigation satellites are complex, expensive and power consuming.

In GPS-like navigation, a number of satellites transmit and a GPS receiver, (e.g. a mobile device) receives signals from a minimum number or "constellation" of the transmitting satellites. However, it is also possible to solve the inverse problem as well, e.g. have many fixed receiver devices that receive signals from a transmitter. In this latter case, the transmitter can be located and tracked. This approach is typically the method of choice for active indoor location systems, typically entitled Real Time Location Systems (RTLS).

In a space, open or covered, "passive" tags can be mounted at known locations. As used herein, "passive" will refer to tags and other devices that acquire their electrical power primarily by scavenging incident or ambient sources of energy, such as electromagnetic (e.g. RF, visible light, etc.), mechanical, and thermal energy. The passive tags transmit signals that are captured by a mobile receiver of a passerby. The mobile receiver can simultaneously capture signals from multiple transmitters and, by correlating the condition of the received signals, can calculate a geometric relationship between the transmitting tags and receiving handheld device. This relationship can be mapped onto an absolute frame of reference, e.g. global longitude, latitude and elevation, by knowing the actual locations of the tags ("transmitters").

A problem with passive tags is that the energy scavenged is generally quite small. Such small amounts of energy are normally not enough to generate powerful and high performance radio carrier waves for data transmission and therefore tend to be limited in range and data capacity.

U.S. Pat. No. 7,180,421, incorporated herein by reference, describes methods and solutions for making a passive Ultra Wide Band (UWB) radio device that can be powered by incident electromagnetic energy and which communicates its data through UWB impulses. The patent does not teach how, however, teach how the communicated data can be used to locate device or to aid in the navigation through environments that deploy such radio devices.

These and other limitations of the prior art will become apparent to those of skill in the art upon a reading of the following descriptions and a study of the several figures of the drawing.

SUMMARY

Embodiments, set forth by way of example and not limitation, include systems, methods and apparatus to locate a mobile device with respect to passive and/or active transmitter beacons whose locations are known and mounted at the premises of interest. The mobile receiver device can locate itself by receiving signals from multiple beaconing tags by acquiring signals from enough of them. The mobile receiver will also receive signals from at least one other receiver whose known position can provide a reference for the mobile receiver to avoid the need for synchronization of the tags. In a further example embodiment, at least of a subset of the transmitter beacons are passive.

Embodiments, set forth by way of example and not limitation, include methods and apparatus for locating a passive tag (e.g. attached to a mobile device or entity), and propagating signals to a multitude of receivers, such that the receivers can compute the location of the tag by observing the differences noticeable in the arrival of the tag signal at different receiver antennas.

In an embodiment, set forth by way of example and not limitation, Ultra Wide Band (UWB) receivers and transmitters are used. By way of non-limiting example, UWB receivers cooperate to locating tags or beacons that transmit UWB signals. In another non-limiting example, a USB mobile receiver (e.g. a smartphone) locates itself by receiving signals from multiple UWB transmitters (e.g. tags or beacons).

In an embodiment, set forth by way of example and not limitation, a tag or beacon uses an impulse radio transmitter to transmit data. This is advantageous in that the power required to transmit the data to the receiver is very small. In a non-limiting embodiment, scavenged energy is used to power an Ultra Wide Band Impulse Radio (UWB-IR) transmitter which can transmit information for a considerable distance and at relatively high data rates.

In an embodiment, set forth by way of example and not limitation, location services are provided by using passive or active transmitters (e.g. satellites) or, inversely, passive or active receivers (e.g. handheld elements or GPS receivers) suitable for both outdoor and indoor applications. Since a GPS system offers only coarse positioning accuracy and requires a high degree of sensitivity and sophistication in the receiver device, embodiments as set forth herein can, in a limited range, provide superior performance to GPS, even in outdoor settings.

In another non-limiting example, radio transmitting tags are attached to physical locations with known coordinates such that signals from a multitude of the tags can provide geometrical location for a receiver of the tag transmitter signals.

In an embodiment, set forth by way of example and not limitation, a receiver device is receptive to transmitting tags RF that comprise tag-specific data, such that this data can trigger the offering of services to the receiver device directly based upon, by non-limiting examples, the content of the tag data or indirectly through using the tag data for linking to other internal or external resources such as data and applications resident in the receiver device or outside in the network. By way of non-limiting examples, such tags provide not only signals to assist the receiver to for location services but also embeds in that signal such information that can be used by the receiver to capture any promotions or currently available services from the entities associated with such tags. Each tag can be associated to, for example, a retailer or business in a shopping mall, or providers of services of different kinds. In a further example embodiment, tags transmit a simple identity code which can be used to search an internal or external system to look up preset locations and associated services and promotions. In a further example embodiment, a determined location of a receiver is used as a pointer to a database of locally or globally available services and offers.

In an embodiment, set forth by way of example and not limitation, a number of radio frequency (RF) tags are attached to known locations in a space to transmit radio signals in which at least information about the location of the transmitting tag is encoded in the signal, such that a mobile receiver can receive the signals from a multitude of the tags and, based on the relative condition of the signals, can calculate its own location. In further example embodiments, the tags are passive and the radio signals include Ultra Wide Band (UWB) impulses.

In an embodiment, set forth by way of example and not limitation, a method for positioning and navigation in a space utilizes a constellation of radio signaling tags that are attached to known positions in the space, where the radio signaling tags transmit radio signals containing at least information about the location of the transmitting tag, such that a mobile receiver can receive the signals from a multitude of the tags and, based on the relative condition of the signals, can calculate its own location in the space. In alternate embodiments the signaling tags are passive and/or the radio signals include Ultra Wide Band (UWB) impulses.

In alternate embodiments, the data received from the tags include more than just the tag's location. For example, the transmitted information ("data") can include additional data such suggestions and solicitations, the tag's identity (ID), commercials, promotions, warnings, guidance information, suggestions and solicitations.

In an embodiment, set forth by way of example and not limitation, a radio communicator receives signals from a constellation of transmitters containing at least the position data of the tags and uses the position ("location") data to determine the location of the radio communicator or a hosting device. By way of non-limiting example, the radio communicator can be connected to a host device, such as a mobile handheld device, which can further process the data received by the radio communicator receiver in order to, by way of non-limiting examples, share the processing burden, display a calculated location on a map, or interacting with a user to utilize the location data in a hosted application or "app."

Furthermore, the radio communicator can be physically attached to the hosting device in a number of ways including via an audio jack, digital interfaces such as USB connectors and/or powered interfaces. The radio communicator can further communicate with the hosting device via any of the radio interfaces of the hosting, including but not limited to cellular radio, Bluetooth, WiFi, NFC and/or GPS. The radio communicator can further communicate with the hosting device through an acoustic interface (e.g. the audio jack, a speaker, and microphone, etc.) and/or an optical interface (e.g. an infrared, video, camera and/or display).

In an embodiment, set forth by way of example and not limitation, a system for positioning and navigation includes attaching a plurality ("constellation") of fixed location radio receiving units to known positions in space, where at least one tag is attached to a mobile entity (e.g. a person, vehicle, transport, etc.) that transmits radio signals containing at least an identifier such that the fixed location receivers can receive the signals from the mobile tag and, based on the relative condition of the signals, the position of the tag in the space can be calculated. In an embodiment the transmitting tag is passive, and the transmitted radio signals are Ultra Wide Band (UWB) impulse signals.

In an embodiment, set forth by way of example and not limitation, a radio communicating tag that is attached to a mobile device and which tag transmits radio signals in which at least an identifier for the transmitting tag is encoded. A constellation of radio receiving units that are respectively attached to known positions in a space can receive the signals from the tags and, based on the relative conditions of the received signals, the position of the tag in the space can be calculated.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

Figure 1:
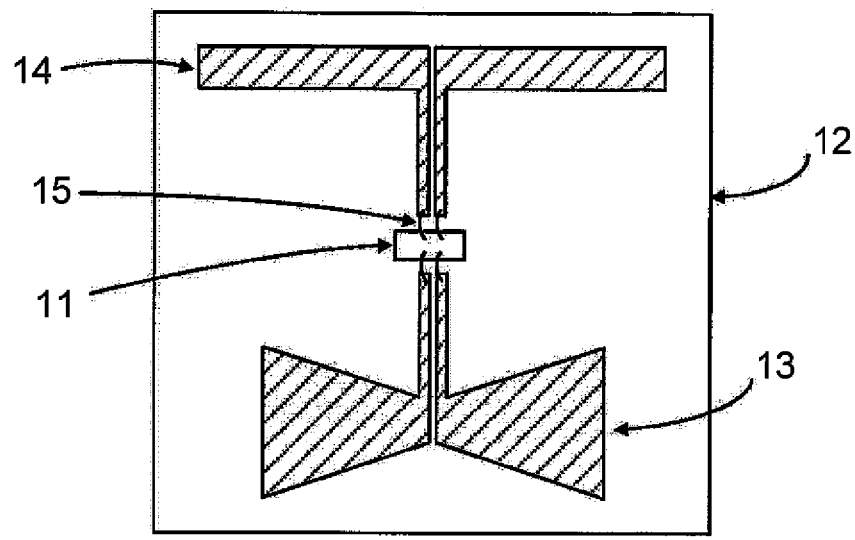
FIG. 1 illustrates an example passive tag with a UWB transmitter or UWB transceiver that is powered by an RF input through an antenna interface.

As used herein the terms "passive tag", "passive device" and the like refer to devices that acquire their power mainly by scavenging incident or ambient sources of energy that may, or may not, be proactively generated. Non-limiting examples of such sources of energy include incident or ambient electromagnetic radiation (e.g. Radio Frequency or "RF" radiation, infrared or "IR" light, visible light, etc.), mechanical energy (e.g. vibration, acoustic energy, pressure, etc.) and thermal (e.g. by conduction, convection, etc.). The term "active tag", "active device" and the like, as used herein, refers to devices that primarily rely on line power or batteries. A "mobile device" or "handheld device", as referred to herein, refers to an electronic device (such as a cellphone, smartphone, tablet computer, etc.) that can be carried or dislocated by a user, or attached/strapped or otherwise transported by any other mobile entity. A "beacon", as used herein, is a device that propagates signals to make others in its environment aware of its existence, identity, location, data, etc. In a non-limiting example, a beacon transmits RF data packets. A "GPS signal module" is one that is capable of receiving signals from multiple GPS satellites, and an "arbitrary signal module" includes a radio frequency (RF) receiver or RF transmitter, or both an RF receiver and RF transmitter, or an RF transceiver, depending upon the embodiment. A "GPS constellation" is a plurality of GPS satellites that can be identified at the same time by a GPS signal module, and a "local device constellation" is a plurality of local devices (e.g. RF transmitters, RF receivers, RF transceivers, etc.) that can be identified at the same time by an arbitrary signal module.

Also, as used herein, "condition of a signal" refers to one or more qualities of a received signal, including the time of arrival of the signal at a receiving antenna, the signal strength, the phase of arrival, the polarization of the signal at the time of arrival, the angle of arrival, the frequency of the signal, the encoding of the signal and any condition in general that shapes the physical, temporal and electrical characteristics of the signal including the data it represents at the point of reception of the signal. Same signal can have different conditions at two different receiving antennas, e.g. the signal from the same transmitter may reach two differently located antennas at two different instances of time at two different signal strengths, phases, frequencies and polarizations, or signals from two different transmitters can have different conditions when arriving at the same receiver in a similar manner.

In many daily business and social contexts, the position of mobile users can guide them towards premises, services and businesses. For example, knowing one's position in a shopping mall, a department store, an office complex, an airport, etc. can simplify the task of navigating through the place and finding the locations of interest. These locations of interest may comprise retailers, restrooms the locations of events and activities. Indoor navigation by people, or inversely the tracking of people indoors, is also important in safety and security scenarios for, for example, rescue and evacuation operations.

In an embodiment, set forth by way of example and not limitation, stores and services that are interested attracting customers and guiding them to their locations attach passive UWB tags to their locations, e.g. their store fronts. These passive tags scavenge, for example, power from ambient light, vibrations or RF signals. A store or service site that identifies itself by an associated tag will help users to identify it electronically from distance. Moreover, a constellation of several tags from multiple installations can cooperatively provide customers carrying a mobile receiver the ability to locate navigate effectively by, for example, using location determination techniques such as Time Difference of Arrival (TDOA), Time of Arrival (TA), signal strength triangulation, angle of arrival, phase of arrival, etc. In addition to these positioning ("locating") techniques, the user can receive data pointers from the signal to additional, and perhaps customized, services and offers.

One practical location determination technique is calculating the Time Difference of Arrival (TDOA) of the signals from multiple tags. The signals that a tag transmits may include the location of the transmitting tag. Alternatively, the tag may transmit a reference, e.g. an ID to the outside world that can be used to look up its location. The user's mobile receiver can observe the time of arrival for signals from multiple tags and by calculating this difference in time of arrival, it can figure out its own location based on the locations of the tags. It should be noted that TDOA normally refers to the time difference of arrival from the same source to different receivers, but in certain example embodiments set forth herein will also refer to the time difference of arrival from different sources to the same receiver.

A common time reference in a TDOA network is necessary. However, since each tag is completely unaware of its network, it cannot be synchronized. In Real Time Location Systems (RTLS), a reference transmitter is normally used as a way to provide a time reference. In a non-limiting embodiment, a reference receiver whose location is known and that can tell the mobile receiver about when the reference receiver captures a particular tag signal is provided so that mobile devices including the mobile receivers can calculate their position using that reference information. Once the mobile device acquires its own location, e.g. inside a shopping mall, it can calculate the relative locations of registered businesses and services, what specials they offer and how to get there.

FIG. 1 illustrates a passive tag that comprises a transceiver chip 11 composed of a Ultra Wideband (UWB) radio transmitter and a Ultra High Frequency (UHF) power scavenger that may also act as a receiver. The chip is mounted on a substrate 12 that also carries the antennas 13 and 14 for the two radio elements UHF and UWB respectively. These elements are connected to one another e.g. via gold or other metal bond wires 15.

Figure 2:
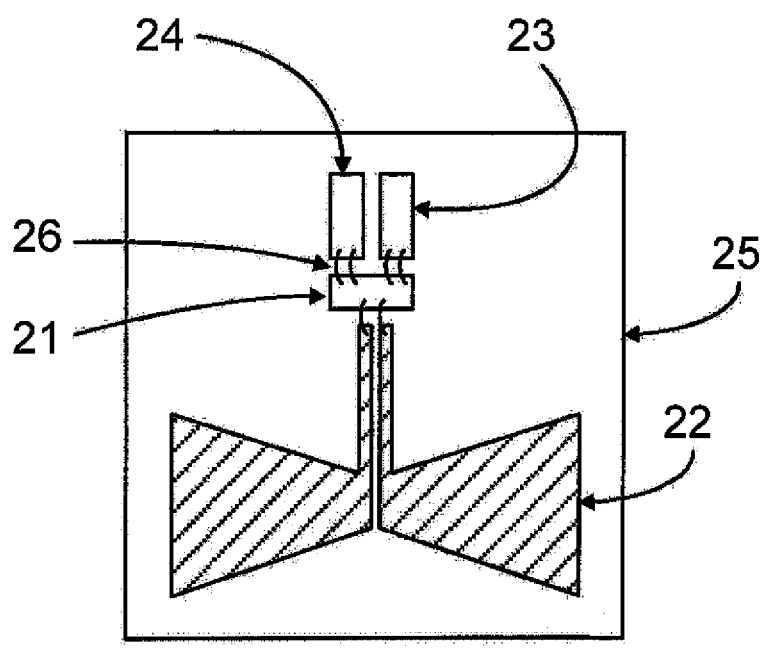
FIG. 2 illustrates an example passive tag that uses a photovoltaic cell for scavenging energy from ambient light.

FIG. 2 illustrates a passive tag that employs a UWB transceiver 21, and its antenna 22, a photovoltaic element 23 that scavenges ambient light and an optional accumulator 24, e.g. a capacitor, rechargeable battery cell or a solid state semiconductor accumulator that acts as a storage unit for the excess power produced by the photovoltaic element to be used when there is no ambient light to be scavenged, e.g. under low light conditions. The substrate 25 supports the elements 21-24 which, as noted above, are electrically coupled together by the bond wires 26.

Figure 3:
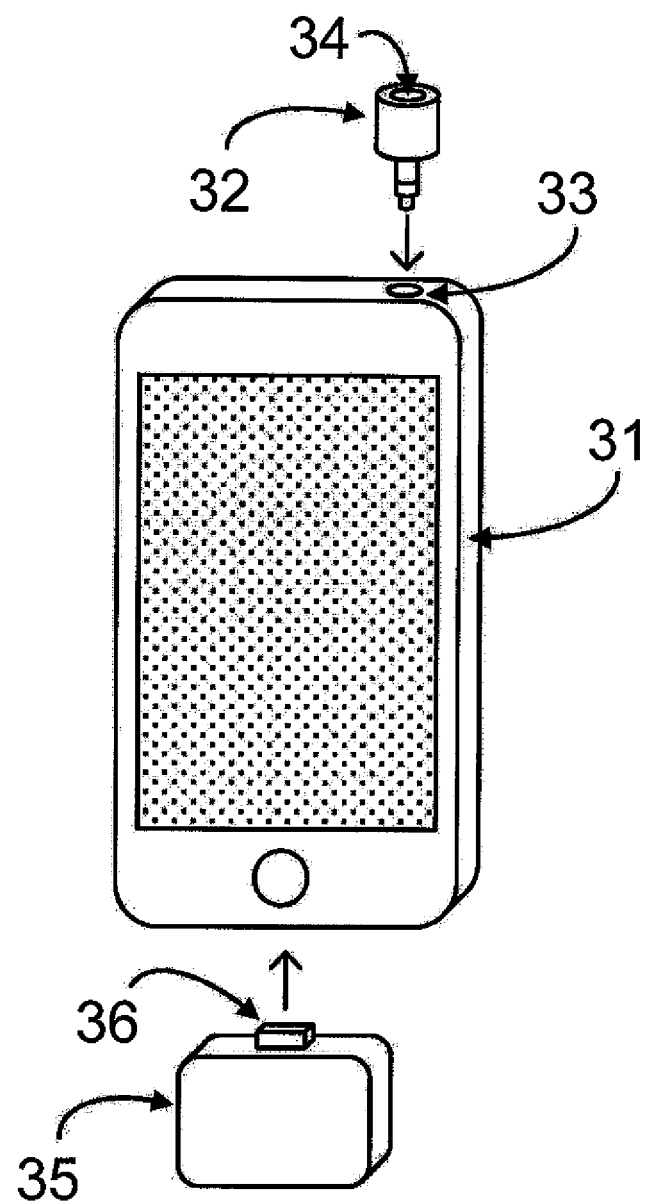
FIG. 3 illustrates a mobile device in the form of a smartphone that can use an example UWB receiver as an accessory attachment.

FIG. 3 illustrates a smartphone 31 with an attachment unit 32 that contains elements and circuits for receiving and time-stamping the arrival of the received signals from, for example, tags. The attachment unit 32 may be an integral part of the smartphone 31, but in this embodiment is depicted as a separate attachment unit. In this case, attachment unit 32 feeds the timestamps into the smartphone, which calculates the location of the mobile device, e.g. with an application ("app") running on the smartphone. The attachment unit 32 may, or may not, do all the location calculations, such that it can be a completely stand-alone unit. This is true about the hosting smartphone as well, where the smartphone can do all or part of the data processing locally or out in the "cloud" by, for example, using network and/or internet resources for calculations, additional processing, as well as accessing more sophisticated tools, processes and databases.

In this example embodiment, the attachment unit 32 is in form of an audio extension adapter which engages with the audio port 33 on the smartphone 31 by replicating the audio port 33 to an extension audio port 34. The circuit in the plug extender can, in non-limiting examples, be charged by audio signals and can communicate with the phone applications through bidirectional audio signals.

In an alternate example embodiment, a digital attachment 35 can be connected to a USB/digital expansion port of the smartphone 31 with a connector 36. A digital attachment can also connect to the host mobile device wirelessly, e.g. through infrared, acoustic, inductive coupling, RF links, etc. It could for example use Bluetooth® technology to connect to, for example, a Bluetooth-enabled smartphone for displaying and/or processing its data.

Figure 4:
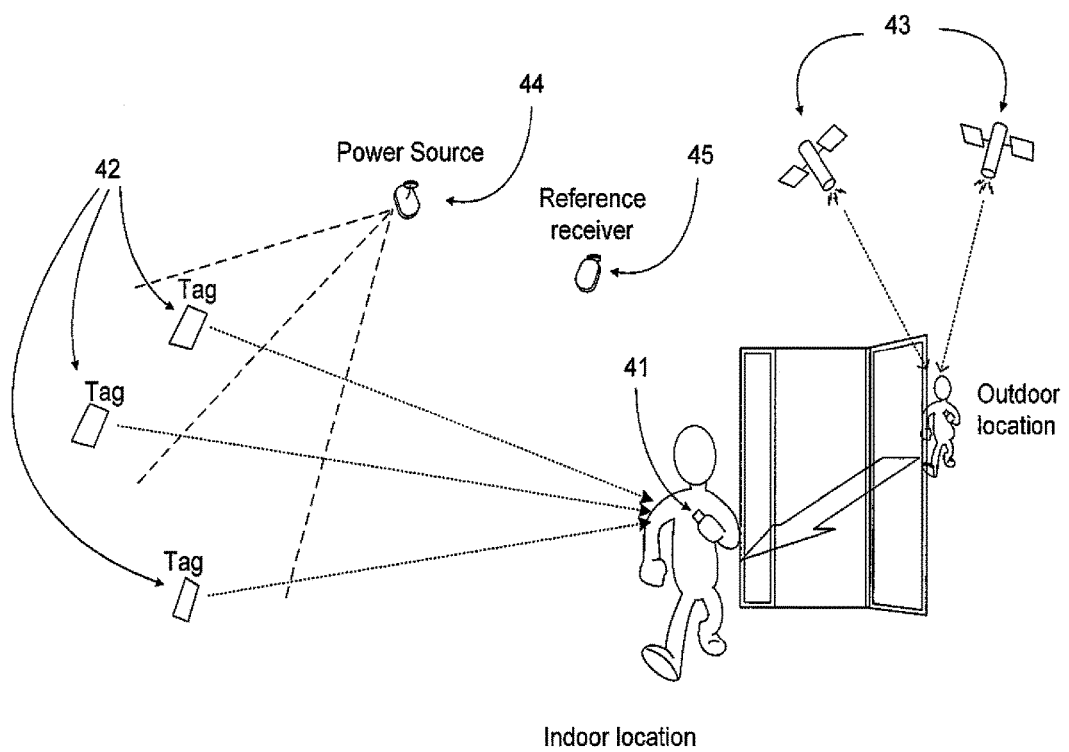
FIG. 4 illustrates an example application of methods and systems as set forth here wherein tags are attached to multiple points of interest and a receiver can calculate its location based on receiving signals from multiple tags.

FIG. 4 illustrates how a mobile user inside an indoor environment, e.g. an office complex, a stadium or a shopping mall, etc. can use a mobile receiver 41 to calculate its location with respect to tagged landmarks ("tags") 42. In this non-limiting example, tags 42 are attached to the storefronts, doors, staircases, ticketing counters, gates, restrooms, etc. By way of non-limiting examples, tags 42 can be powered by strategically placed exciter sources 44 that typically emit electromagnetic power signals. Alternatively or additionally, tags 42 can be powered by scavenged energy as described previously.

Those tags 42 that are in a reception range of the user's receiver device 41 are considered a "constellation" of tags for the receiver device. Both the physical properties of the signal, such as strength, time and difference of time of arrival, angle of arrival, phase of the signal at the receiving antenna, frequency of the signal, its polarization, etc., and the data carried by the signal may be used to make the receiving device aware of the location, identity, codes, messages and any other information broadcast by the transmitter. This information is compared to the similarly and often simultaneously received signals from other broadcasting tags in the receiving range. This comparison provides the receiver with the information about how far it is located from each transmitting tag and thereby where it is located.

In a further non-limiting embodiment, a reference receiver 45, positioned at a known location, can compensate for lack of synchronicity in the network. In this embodiment, the deployment of the landmark tags is easy as the tags can be implemented as stickers that are attached to, by way of non-limiting example, the front door or facade of the premises. The receiver can be associated with a hosting mobile device, connected as a wired or wireless attachment to the mobile device, or act as a standalone device.

FIG. 4 further illustrates, by way of non-limiting example, how the mobile device of users can be located by GPS satellites 43 when the mobile user is outdoors and then, as they enter an indoor environment, the mobile device detects the presence of tags 42 and switches to indoor location determination. The transition from outdoors GPS navigation to indoors navigation is preferably implemented seamlessly in the mapping presentation of the mobile device such that the users do not detect any interruptions or jitters as they enter the indoor environment.

In this embodiment, set forth by way of example and not limitation, each tag transmits its location and optionally additional information such as its identity and such information that is informative to the user. For example, the business hours of a store, promotional coupons, discounts, the temperature of the surroundings, the latest news, menus, etc. can be pushed to mobile visitors as they walk through a shopping mall and as they enter the transmission range of the tags mounted at the stores.

Figure 5:
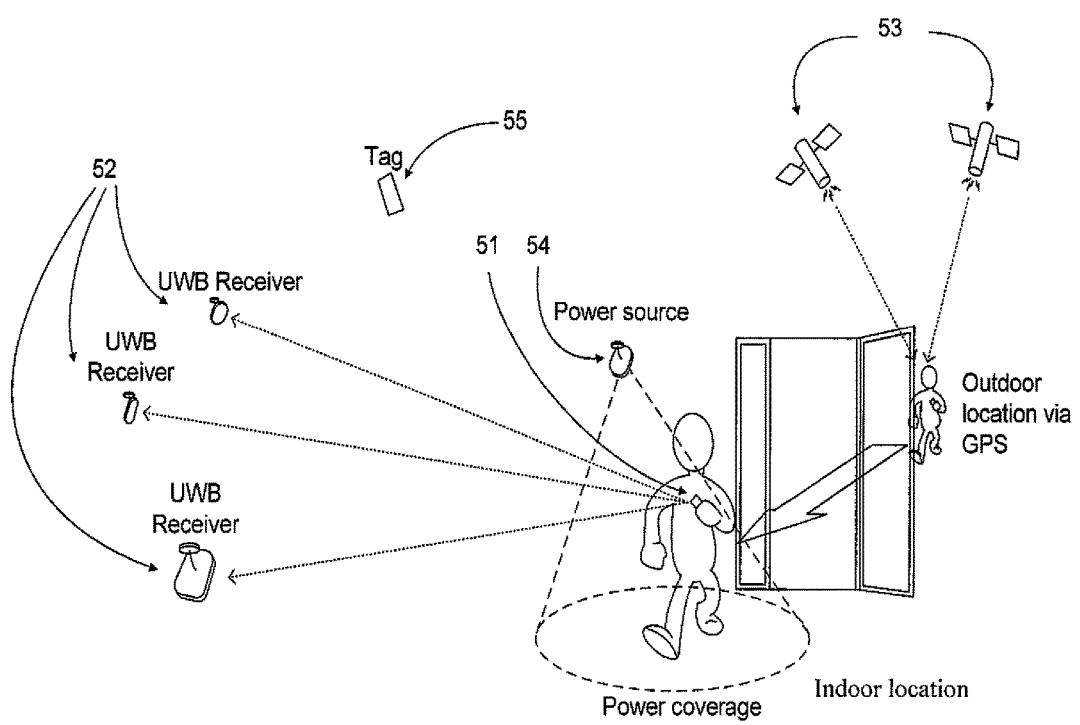
FIG. 5 illustrates, by way of example and not limitation, an inverse application to FIG. 4, wherein receivers are attached to multiple points of interest and a tag is attached to, or a part of, a mobile device.

FIG. 5 illustrates, by way of non-limiting example, an inverse embodiment of FIG. 4. Here, the user is holding a mobile device 51 that is equipped with a transmitter tag. This transmitter broadcasts UWB impulses that are received by UWB receivers 52 mounted at the landmarks of interest, e.g. storefronts. When the user is in the range of the receivers 52, then the constellation of the receivers that receive impulses from the mobile device tag will be capable of figuring out the location of the mobile device 51 carried by the user. In this case, the deployment of the transmitter in the mobile device can be as simple placing a passive transmitter sticker on the mobile device, but the receiver infrastructure is more elaborate than in the embodiments of FIG. 4. The receiver infrastructure can communicate with the mobile device 51 though the transmitter tag (if configured as a transceiver or a transmitter and receiver) or through other modalities, such as Bluetooth, WiFi, a cellular network, the internet, etc. to provide mobile device identity and other information to the mobile device 51.

For examples where a tag passive, it can be powered by a power source 54, as the case was in the embodiment of FIG. 4. Alternatively, the tag can be an integral part of the mobile device or scavenge its power from the mobile device, e.g. by means of power coupling to the power circuitry of the mobile device or use the power available in the mobile device through a direct connection to its power source. In an alternate example embodiment, these solutions can also integrate into the mobile device. Furthermore, a reference tag 55 is also used to avoid the need for synchronicity in the system.

Figure 6:
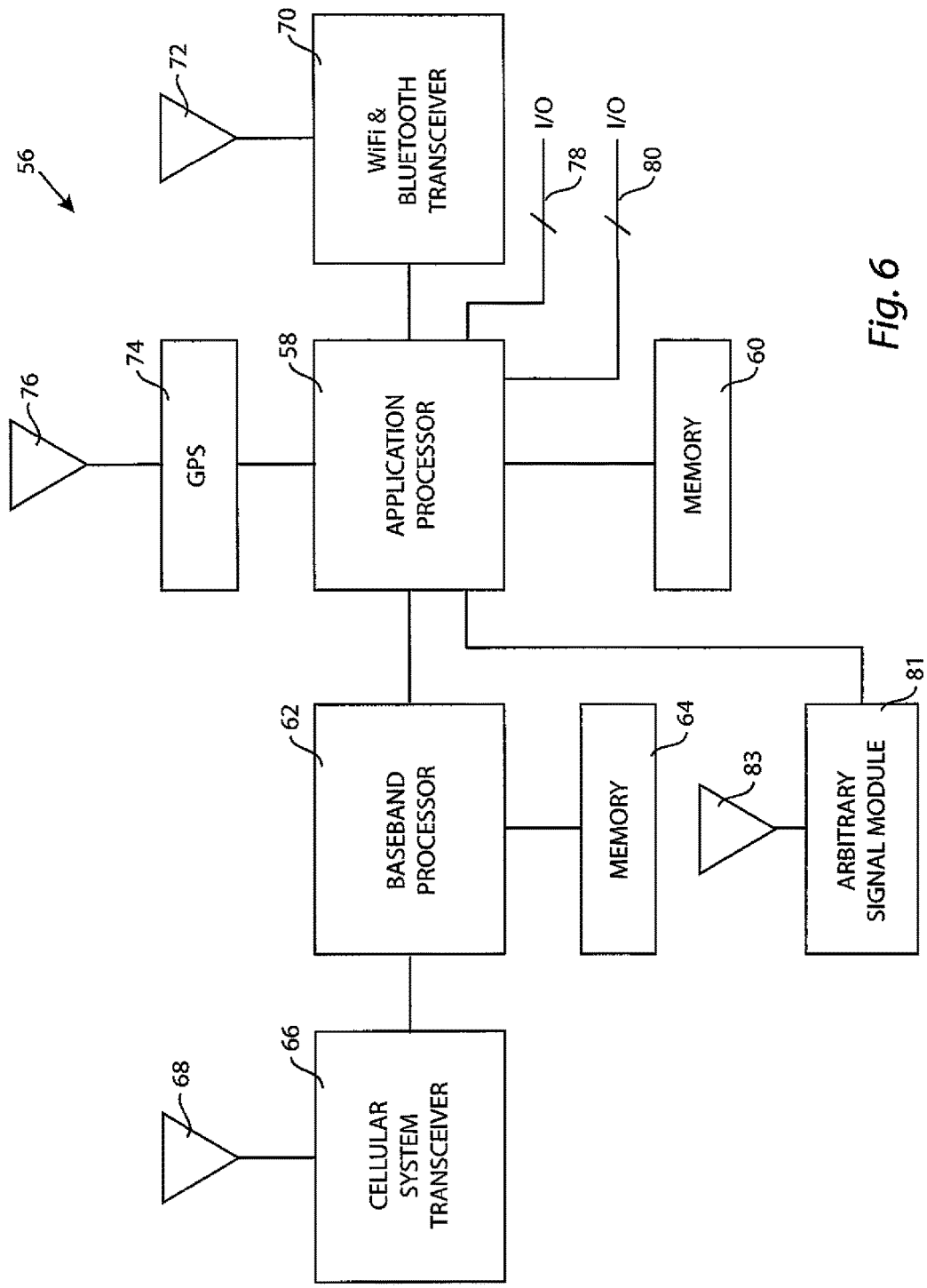
FIG. 6 is a block diagram, set forth by way of example and not limitation, of a wireless mobile device configured for local indoor positioning and navigation by detection of arbitrary signals.

FIG. 6 is a block diagram of the electronic and electrical circuitry 56 of an example wireless mobile device 31. The circuitry 56 includes an application processor 58 having memory 60 and a baseband processor 62 having memory 64. The baseband processor 62 is coupled to the cellular system transceiver 66 having an antenna 68, and the application processor 58 is coupled to a WiFi and Bluetooth transceiver 70 having an antenna 72. The application processor 58 is also coupled to a GPS module 74 having an antenna 76, to an I/O bus 78 coupled to a multi-pin connector (e.g. receptive to connector 36 of FIG. 3), and by an I/O bus 80 coupled to an audio jack connector (e.g. audio port 33 of FIG. 3). The I/O busses 78 and 80 can be used to connect to connect an external arbitrary signal module to the application processor 58. Examples of external arbitrary signal modules include attachment unit 32 and digital attachment 35 of FIG. 3. Alternatively, an internal arbitrary signal module 81, having an antenna 83, can be coupled to the application processor 58. It should be noted that an arbitrary signal module (such as arbitrary signal module 81) can include a transmitter or a receiver, both a transmitter and a receiver, or a transceiver.

Figure 7:
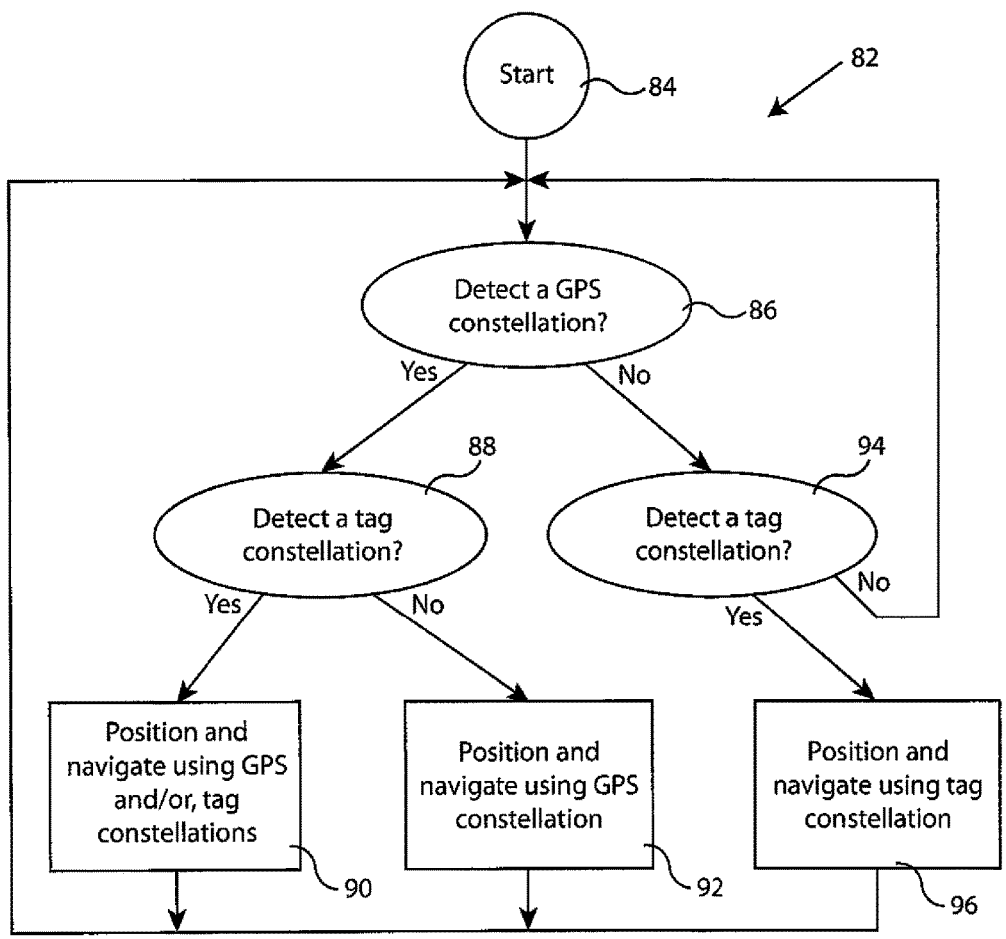
FIG. 7 is a flow diagram, set forth by way of example and not limitation, of a for local indoor positioning and navigation by detection of arbitrary signals process.

FIG. 7 is a flow diagram, set forth by way of example and not limitation, of a positioning and navigation process 82 that may be implemented by, for example, wireless mobile device 31. The process 82 begins at 84 and, in an operation 86, it is determined if a constellation of GPS satellites is detected. If yes, an operation 88 determines whether a constellation of tags are also detected and, if so, the mobile device 31 can implement position and navigation processes using GPS constellations and/or tag constellations in an operation 90. If only a GPS constellation is detected, the position and navigation processes are implemented using the GPS constellation alone in an operation 92. If operation 86 does not detect a GPS constellation, an operation 94 determines whether a tag constellation is detected. If yes, the position and navigation processes are implemented using the tag constellation in an operation 96. If the result of the operation 94 is that neither a GPS constellation nor a tag constellation is detected, or with the completion of operations 90, 92 and 96, process control returns to operation 82 to restart the detection process.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A wireless mobile device for local indoor positioning and navigation by detection of arbitrary signals comprising:
    a GPS signal module having an antenna, the GPS signal module being operative to detect a GPS constellation comprising a plurality of GPS satellites;
    an arbitrary signal module having an antenna, the arbitrary signal module including at least one of a radio frequency (RF) receiver, a RF transmitter, and an RF transceiver operative to communicate with a local device constellation;
    an application processor coupled to the GPS signal module and the arbitrary signal module; and
    memory coupled to the application processor including code segments executable on the application processor for
    a) identifying a GPS constellation comprising a plurality of GPS satellites that are identified at the same time by the GPS receiving module;
    b) identifying a local device constellation comprising a plurality of local devices that are identified at the same time by the arbitrary signal module, wherein the local device constellation is a tag constellation including a plurality of RF tags; and
    c) implementing a position and navigation process using at least one of a detected GPS constellation and a detected local device constellation, wherein if a GPS constellation and a local device constellation are detected the position and navigation process will solely use the GPS constellation.

2. A wireless mobile device for local indoor positioning and navigation by detection of arbitrary signals as recited in claim 1 wherein an identified local device constellation comprises a plurality of radio frequency (RF) transmission tags and wherein the arbitrary signal module includes an RF receiver.

3. A wireless mobile device for local indoor positioning and navigation by detection of arbitrary signals as recited in claim 2 wherein the plurality of RF transmission tags are passive.

4. A wireless mobile device for local indoor positioning and navigation by detection of arbitrary signals as recited in claim 2 wherein the plurality of RF transmission tags transmit with Ultra Wideband impulses.

5. A wireless mobile device for local indoor positioning and navigation by detection of arbitrary signals as recited in claim 4 wherein the Ultra Wideband impulses include information about the location of the RF transmission tags.

6. A wireless mobile device for local indoor positioning and navigation by detection of arbitrary signals as recited in claim 1 wherein an identified local device constellation comprises a plurality of radio frequency (RF) receiver and wherein the arbitrary signal module includes an RF transmitter.

7. A wireless mobile device for local indoor positioning and navigation by detection of arbitrary signals as recited in claim 6 wherein the RF transmitter is a passive RF tag.

8. A wireless mobile device for local indoor positioning and navigation by detection of arbitrary signals as recited in claim 6 wherein the RF transmitter transmits an mobile device identification signal.

9. A method for local indoor positioning and navigation by detection of arbitrary signals comprising:
    a) determining if a GPS constellation can be identified by detecting a plurality of GPS satellites at the same time with a GPS signal module having an antenna;
    b) determining if a local device constellation can be identified by detecting a plurality of local devices at the same time with an arbitrary signal module having an antenna, wherein the local device constellation is a tag constellation including a plurality of radio frequency (RF) tags; and
    c) implementing a position and navigation process with an application processor coupled to the GPS signal module and the arbitrary signal module using at least one of a detected GPS constellation and a detected tag constellation;
    wherein if a tag constellation and a GPS constellation are detected the position and navigation process will solely use the GPS constellation.

10. A method for local indoor positioning and navigation by detection of arbitrary signals as recited in claim 9 wherein the local device constellation is a receiver constellation including a plurality of radio frequency (RF) receivers.

11. A method for local indoor positioning and navigation by detection of arbitrary signals as recited in claim 10 wherein determining if a GPS constellation can be identified is implemented by a mobile device.

12. A method for local indoor positioning and navigation by detection of arbitrary signals as recited in claim 9 wherein the local device constellation is a tag constellation including a plurality of radio frequency (RF) transmitting tags.

13. A method for local indoor positioning and navigation by detection of arbitrary signals as recited in claim 12 wherein the tag constellation comprises a plurality of passive tags.

14. A method for local indoor positioning and navigation by detection of arbitrary signals as recited in claim 13 wherein the plurality of passive tags communicate by Ultra Wideband impulses.

15. A method for local indoor positioning and navigation by detection of arbitrary signals as recited in claim 14 wherein the Ultra Wideband impulses include information about the locations of the plurality of passive tags.

* * * * *